Figure 1:
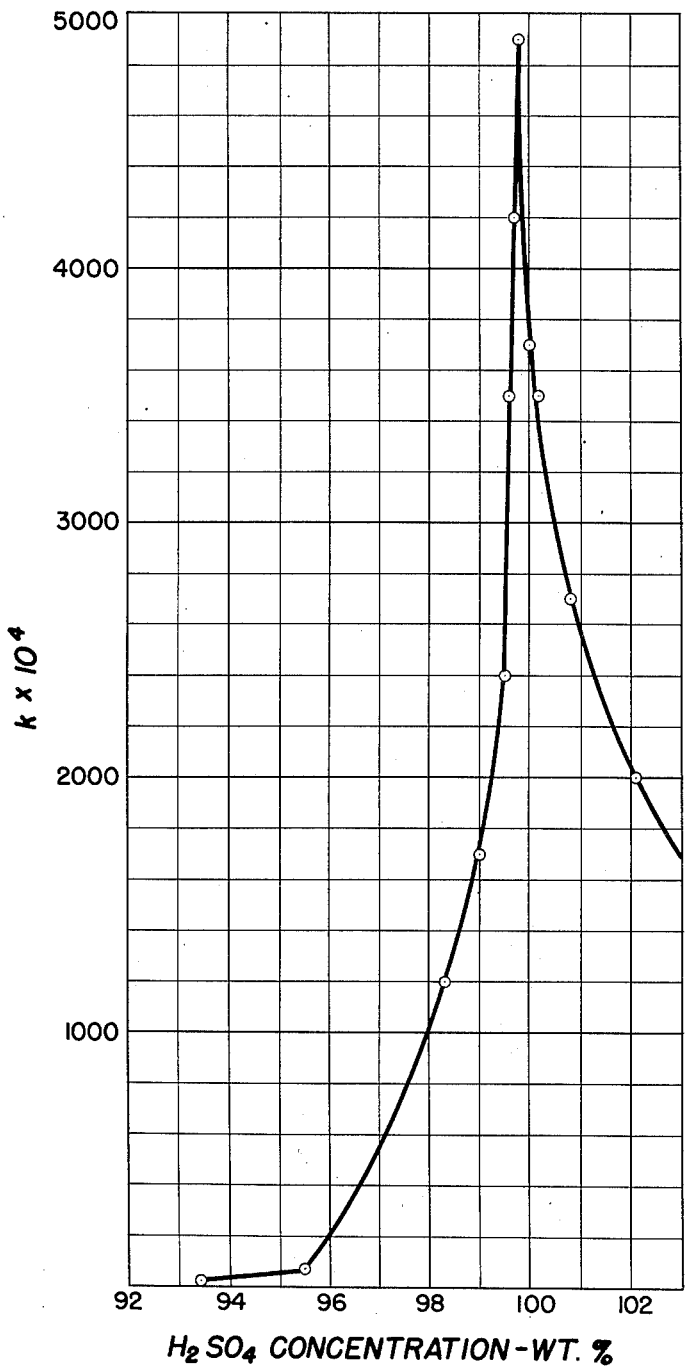

Dec. 23, 1952  A. K. ROEBUCK ET AL  2,623,076
ISOMERIZATION OF SATURATED HYDROCARBONS WITH SULFURIC ACID
Filed March 31, 1949  4 Sheets-Sheet 1

-3-METHYLPENTANE ISOMERIZATION-

INVENTORS:
Alan K. Roebuck
Bernard L. Evering
By:
ATTORNEY

—DIMETHYLPENTANES ISOMERIZATION—

INVENTORS:
Alan K. Roebuck
Bernard L. Evering

Patented Dec. 23, 1952

2,623,076

UNITED STATES PATENT OFFICE 2,623,076

ISOMERIZATION OF SATURATED HYDROCARBONS WITH SULFURIC ACID

Alan K. Roebuck, Hammond, Ind., and Bernard L. Evering, Chicago, Ill., assignors to Standard Oil Company, Chicago, Ill., a corporation of Indiana Application March 31, 1949, Serial No. 84,686

7 Claims. (Cl. 260—666)

This invention relates to a process for the isomerization of alkyl-substituted, particularly methyl-substituted, saturated hydrocarbons. By the term "isomerization" as used herein we intend to define a process for shifting or transferring an alkyl group from one carbon atom to another carbon atom within a saturated hydrocarbon molecule to produce either a chain isomer or a geometric isomer.

In a more particular aspect, this invention is concerned with a catalytic process for effecting the isomerization of monomethyl-substituted alkanes or of dimethyl-substituted alkanes, the latter containing no quaternary carbon atom, having a secondary carbon atom adjacent a methyl-substituted carbon atom.

Sulfuric acid is a well-known catalyst for the type of isomerization reactions which form the subject of our invention. Thus, U. S. Patent 2,404,661 of R. T. Sanderson, issued July 23, 1946, describes the isomerization of 2,4-dimethylpentane to 2,3-dimethylpentane in the presence of 95 percent sulfuric acid and expresses a preference for the use of 97 percent sulfuric acid as the isomerization catalyst. U. S. Patent 2,373,740 of S. F. Birch et al., issued April 17, 1945, describes the interconversion of 2,3- and 2,4-dimethylpentanes in the presence of concentrated sulfuric acid and presents three working examples in which 97 percent sulfuric acid was employed. P. D. Caesar and A. W. Francis, Ind. Eng. Chem. 33, 1426–8 (1941), likewise employed 97 percent sulfuric acid at 50° C. for the isomerization of 2,4-dimethylpentane to 2,3-dimethylpentane.

However, it has not heretofore been appreciated that the rate of isomerization of certain alkl-substituted, particularly methyl-substituted, saturated hydrocarbon charging stocks is closely connected with the concentration of the sulfuric acid employed as the catalyst. We have found that the concentration of the sulfuric acid has an unexpected and important bearing on the rate of isomerization of certain saturated hydrocarbons, as will be pointed out in detail hereinafter, and have established a narrow and critical range of sulfuric acid concentrations within which this catalyst may best be employed for the relatively high-rate isomerization of certain methyl-substituted saturated hydrocarbons.

It is an object of this invention to provide a novel process for the isomerization of alkyl-substituted, particularly methyl-substituted, saturated hydrocarbons, particularly monomethyl or dimethyl-substituted alkanes, having a secondary carbon atom adjacent a methyl-substituted carbon atom. Another object of this invention is to provide an improved process for the catalytic isomerization of monomethylpentanes and 2,3- or 2,4-dimethylpentanes. An additional object of this invention is to provide an improved process for the isomerization of cis- and trans-dimethylcyclohexanes. Still another object of our invention is to provide a method for increasing the rate of isomerization of certain saturated hydrocarbons. A further object of our invention is to provide a continuous process for the high-rate isomerization of certain saturated hydrocarbons. Yet another object of our invention is to provide a novel process for removing isomerization-inhibiting impurities from the saturated hydrocarbon charging stocks. These and other objects will become apparent from the ensuing description of our invention read in conjunction with the annexed figures.

We have found that the rate of isomerization of various methyl-substituted saturated hydrocarbons in sulfuric acid is closely connected with the concentration of the sulfuric acid and that, surprisingly, the initial concentration of the sulfuric acid catalyst charged to the isomerization reactor must be between 99 and 100 percent sulfuric acid in order to obtain a maximum and surprisingly increased rate of isomerization as compared with sulfuric acid of other concentrations, for example 96% or 97% concentrated sulfuric acid which is an article of commerce.

When 96–98 weight percent sulfuric acid is employed as a catalyst for the isomerization of various saturated hydrocarbons, the rate of isomerization is low at room temperature or moderately elevated temperatures, while elevated temperatures above about 75° C. are impractical because of the rapid oxidative attack of the acid catalyst upon the hydrocarbon. When fuming sulfuric acid is employed as the isomerization catalyst, the acid rapidly oxidizes and degrades the saturated hydrocarbon stock, even at room temperature and the catalyst is rapidly diluted with water and other hydrocarbon degradation products, causing a sharp decline in the isomerization capacity of the catalyst. Furthermore, as will be shown hereinafter, the rates of isomerization obtained with fuming sulfuric acids are far lower than those induced by sulfuric acid of 99 to 100 weight percent concentration.

The important unexpected effects of the concentration of the sulfuric acid catalyst upon rates of isomerization will be brought out by the specific examples of our invention which follow and which are intended to illustrate but not unnecessarily to limit the scope of our invention.

In the following specific examples of our invention, the hydrocarbon charging stock was intimately contacted with about an equal weight of the sulfuric acid catalyst, usually by vigorous mechanical stirring, in a glass reaction vessel at room temperature (20 to 25° C.) for a period of time sufficient to obtain substantial reaction, usually one hour or more. The concentration of the sulfuric acid catalyst was determined by titration with caustic. The course of isomerization was followed by determining the refractive index of the hydrocarbon mixture obtained from the reaction zone, it having been found that analysis of the reaction mixtures by this method gave results which corresponded closely to the results obtained by careful fractional distillation of the hydrocarbon reaction products. Careful control was exercised in all the operations and it could be shown that the maximum error entailed in determining isomerization rates was about 5%.

The isomerization rate, $k$ was determined by the use of the standard formula $$k = \frac{x_e}{a} \frac{2.303}{t} \log \frac{x_e}{x_e - x}$$

wherein $X_e$ is the amount of product formed at equilibrium, $a$ is the initial concentration of reactant, $t$ is time and $X$ is the amount of product formed in time $t$. In order to lay a consistent basis for comparison of isomerization rates and for reasons of convenience that will appear hereinafter, $k$ was determined at the end of a reaction period of one hour, except where otherwise indicated. As a result, $k \times 10^2$ is equivalent to mol percent conversion of the hydrocarbon charging stock per hour.

EXAMPLE 1

Employing the above-described operating technique, 3-methylpentane was isomerized with sulfuric acid catalysts of various initial concentrations, extending from a concentration of 93.4 weight percent of sulfuric acid to 102.1 weight percent sulfuric acid. The significant data are presented in Table 1 and a graphical representation of the effect of initial sulfuric acid concentration upon the rate of isomerization is set forth in Figure 1. The results are extremely surprising and indicate that as the sulfuric acid concentration is increased to about 99 weight percent, a very large unexpected increase in the rate of isomerization occurs. The precipitous increase in the rate of isomerization attains a maximum at 99.7 to 99.8 sulfuric acid. It will be noted from Table 1 and Figure 1 that the rate of isomerization with 100% sulfuric acid was considerably lower than with 99.7 or 99.8% sulfuric acid. The isomerization reaction involved is evidently complicated by the concurrent progress of other and undesired reactions, such as an oxidative attack of sulfuric acid upon the hydrocarbon charging stock, which apparently rapidly reduces the acid strength and its isomerization power by the production of water and, possibly, acid-soluble hydrocarbon oxidation products. Apparently the best balance of desirable and undesirable reactions is reached by the employment of sulfuric acid having an initial concentration of 99.7 or 99.8 weight percent.

Table 1
ISOMERIZATION OF 3-METHYLPENTANE

| Acid Concentration, Wt. Percent | $k \times 10^4$ |
|---|---|
| 93.4 | [1] 26 |
| 95.5 | [1] 71 |
| 98.3 | 1,200 |
| 99.0 | 1,700 |
| 99.5 | 2,400 |
| 99.6 | 3,500 |
| 99.7 | 4,200 |
| 99.8 | 4,900 |
| 100.0 | 3,700 |
| 100.2 | 3,500 |
| 100.8 | 2,700 |
| 102.1 | 2,000 |

[1] One hour times give insufficient change for measurement.

Figure 2:
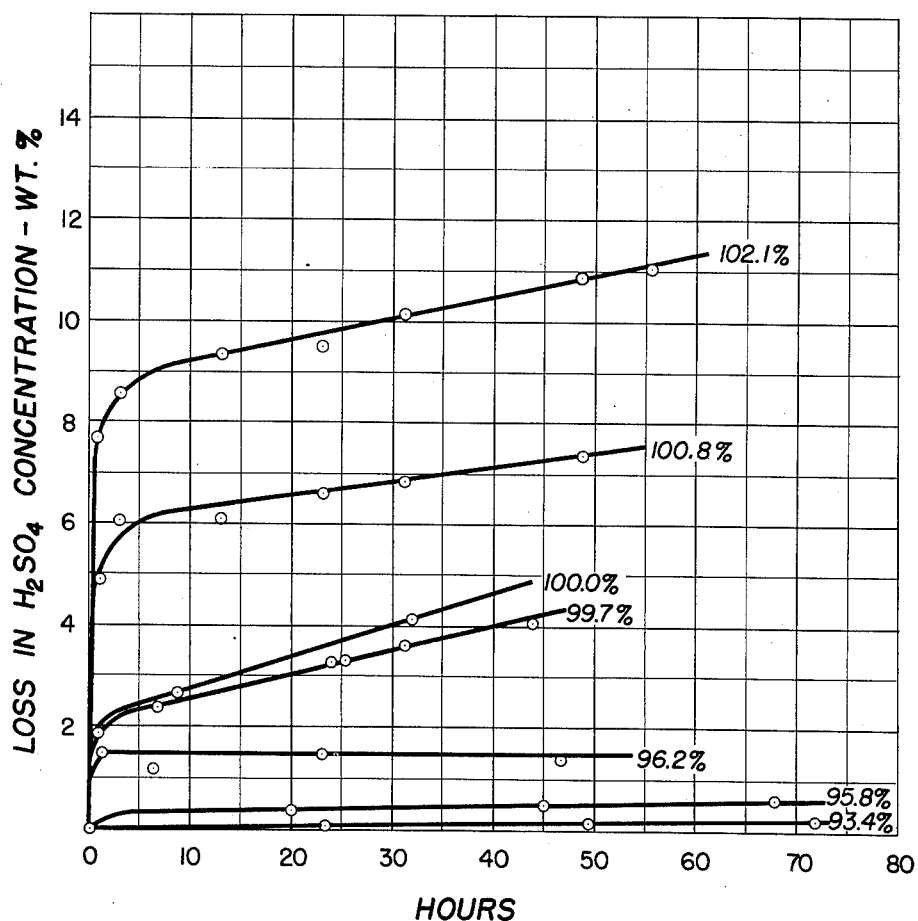

The effect of sulfuric acid concentration upon its rate of degradation in the isomerization of 3-methylpentane is graphically presented in Figure 2. It will be noted that the acids having low isomerization activity degraded at a low rate. The 99.7 and 100.0% sulfuric acid degraded rapidly at the beginning of the isomerization reaction period, following which the rate of acid degradation was reduced. Very marked rates of acid degradation were observed in the employment of 100.8 and 102.1% sulfuric acids, indicating a high rate of oxidative attack of these acids upon the 3-methylpentane charging stocks. The high rate of oxidative attack rapidly depleted the strength of the fuming sulfuric acids and reduced their isomerizing power. It will be noted that at the end of only one hour the concentrations of the 100.8 and 102.1 sulfuric acids have been reduced to values lower than the concentrations of the sulfuric acids of 99.7 and 100.0% initial strengths. Our studies of the rates of acid degradation in the isomerization of 2,3- and 2,4-dimethylpentanes have produced curves quite similar to those in Figure 2 and it is, therefore, unnecessary to detail these data.

We have observed that dilution of the sulfuric acid catalyst with hydrocarbons does not reduce its isomerizing capacity to the extent induced by an equal amount of water. It is feasible to permit the titratable acidity of the acid catalyst (diluted with hydrocarbons) to fall by about eight weight percent before removing it from the reaction zone as spent acid.

EXAMPLE 2

The effects of variations in initial sulfuric acid concentration upon the rate of isomerization of 2,3-dimethylpentane are presented in the following table.

Table 2
ISOMERIZATION OF 2,3-DIMETHYLPENTANE

| Acid Concentration, Wt. Percent | $k \times 10^4$ |
|---|---|
| 97.0 | 500 |
| 98.5 | 800 |
| 99.4 | 1,100 |
| 99.8 | 1,500 |
| 100.0 | 440 |

Figure 3:
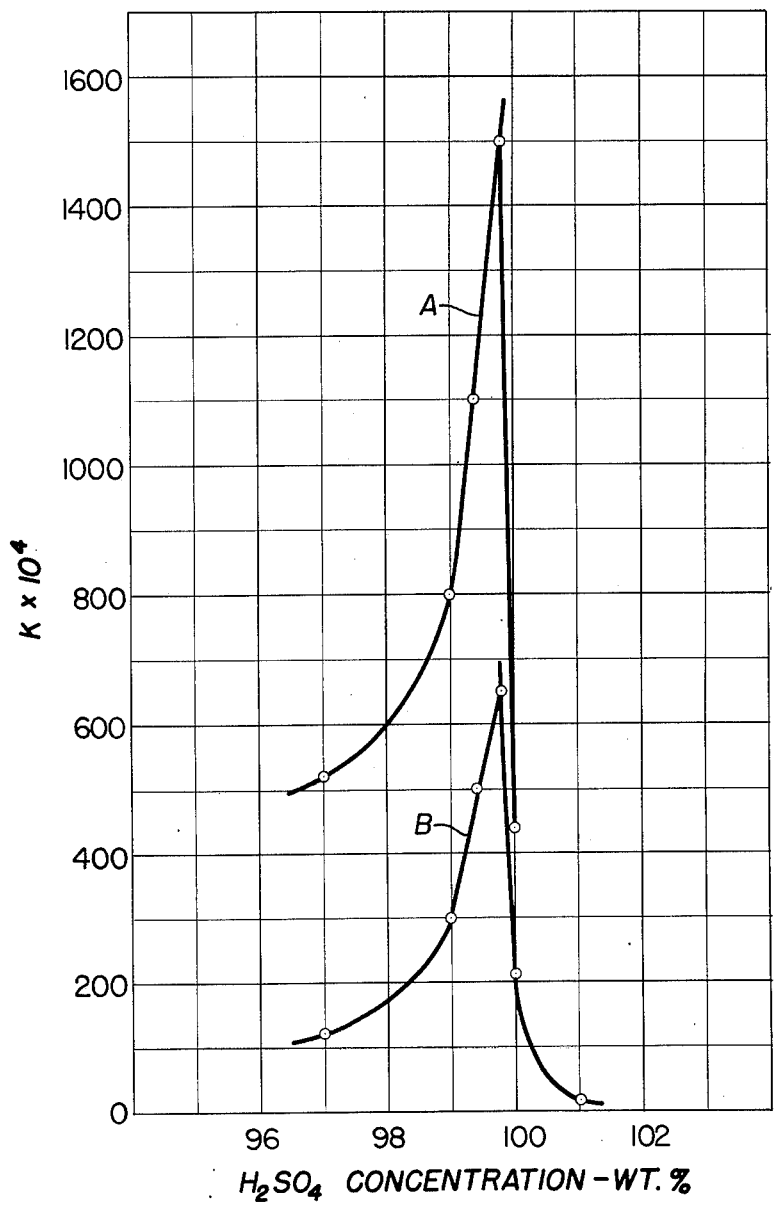

The data of Table 2 is represented graphically in curve A of Figure 3.

EXAMPLE 3

The effect of variations in initial sulfuric acid concentration upon the rate of isomerization of 2,4-dimethylpentane are presented in the following table.

Table 3
ISOMERIZATION OF 2,4-DIMETHYLPENTANE

| Acid Concentration, Wt. Percent | $k \times 10^4$ |
| --- | --- |
| 97.0 | 120 |
| 98.5 | 300 |
| 99.4 | 500 |
| 99.8 | 650 |
| 100.0 | 210 |
| 101.0 | 15 |

The data of Table 3 are presented graphically in curve B of Figure 3.

Examples 2 and 3 indicate, surprisingly, that substantially the same concentration of sulfuric acid is effective in achieving the maximum rate of dimethylpentane isomerization as was observed in Example 1 for the isomerization of a monomethylpentane.

EXAMPLE 4

The effects of variations in initial sulfuric acid concentration upon the rate of isomerization of cis-1,4-dimethylcyclohexane are presented in the following table.

Table 4
ISOMERIZATION OF CIS-1,4-DIMETHYLCYCLOHEXANE

| Acid Concentration, Wt. Percent | $k \times 10^4$ |
| --- | --- |
| 95.7 | 2,000 |
| 98.5 | 8,500 |
| 99.8 | 13,000 |
| 100.1 | 11,000 |

EXAMPLE 5

The effects of variations in initial sulfuric acid concentration upon the rate of isomerization of trans-1,3-dimethylcyclohexane are presented in the following table.

Table 5
ISOMERIZATION OF TRANS-1,4-DIMETHYL CYCLOHEXANE

| Acid Concentration, Wt. Percent | $k \times 10^4$ |
| --- | --- |
| 95.7 | 40 |
| 98.5 | 390 |
| 99.8 | 1,500 |
| 100.1 | 850 |

It is apparent from the data tabulated in Examples 4 and 5 that the 99.8% is the optimum initial concentration of sulfuric acid for the cis-trans interconversion of 1,4-dimethylcyclohexanes, just as it was in the isomerization of monomethyl- and dimethyl pentanes.

It will be apparent that the shift of the methyl group about a single carbon atom could be applied to other hydrocarbons such as cis- and trans-1,2-dimethyl cyclohexane, cis- and trans-1,2-dimethylcyclopentane and the like. In the isomerization of cis- and trans-1,4-dimethylcycloxehanes, a very small quantity of 1,3-dimethylcyclohexane, at most about 10 per cent, was noted.

We have observed that various impurities in the hydrocarbon charging stocks may exert substantial effects upon the rate of isomerization. Thus, in the isomerization of 3-methylpentane containing 2 per cent benzene in the presence of an equal quantity of 99.7 per cent sulfuric acid, the reaction velocity constant $k$, was about one-half of that obtained in the same reaction in the absence of benzene. It was observed that the benzene went completely into solution in the acid layer in fifteen minutes, as shown by both hydrocarbon and acid analyses. In a further experiment, it was found that 1 per cent of benzene, based on 3-methylpentane, was about as effective as 2 per cent benzene in reducing the isomerization rate, determined at the end of a one hour reaction period. Since our experience indicates that a low degree of hydrocarbon dilution of the sulfuric acid catalyst usually does not greatly reduce its isomerizing capacity, it is believed that benzene may be a specific catalyst poison. It is also possible that benzene reduces the isomerization activity of strong sulfuric acids by forming benzenesulfonic acid and an equimolal quantity of water which, as has been shown above, very greatly reduces the isomerizing capacity of sulfuric acid when it is present in concentrations exceeding 1 per cent. It seems quite probable that any aromatic hydrocarbon which is readily sulfonated by concentrated sulfuric acid at about room temperature would exhibit the same "poisoning" effects on sulfuric acid isomerization catalysts.

We have also observed that in the isomerization of 3-methylpentane with an equal weight of 99.7 per cent sulfuric acid at room temperature, the addition of 4 per cent of cyclohexane, based on 3-methylpentane, did not affect the reaction velocity constant and that the cyclohexane was not absorbed at all in the sulfuric acid catalyst.

In general, oxygen-, nitrogen- and sulfur-containing organic compounds are quite readily absorbed in sulfuric acid and tend to reduce its capacity for high rate catalytic isomerization of charging stocks such as may be employed in the practice of our invention. We have observed that the presence of olefins in the saturated hydrocarbon charging stocks tends to reduce the rate of isomerization. Thus, in the isomerization of 3-methylpentane with an equal weight of 99.8 per cent sulfuric acid at 20° C., the addition of 1 per cent of cyclohexene to the feed stock reduced the isomerization rate at the end of one hour by about 38 per cent and the addition of 1 per cent of 2-methyl-2-butene reduced the isomerization rate by about 33 per cent. On the other hand, the addition of 1 per cent of cyclohexene peroxide to the 3 methylpentane charging stock increased the isomerization rate by about 67 per cent, as determined at the end of a one hour reaction period. The addition of 1 per cent of 2-methyl-2-butene peroxide resulted in a 100 per cent increase in the rate of 3-methylpentane isomerization, as determined at the end of one hour reaction period.

The effects of various proportions of potassium persulfate upon the isomerization of 3-methylpentane in the presence of an equal weight of 99.7 per cent sulfuric acid at 20° C. are shown in the following table.

Table 6

| | Wt. Per Cent Potassium Persulfate | | | | |
| --- | --- | --- | --- | --- | --- |
| | 0.0 | 0.03 | 0.06 | 0.12 | 0.24 |
| Relative Isomerization Rate | 1 | 1.29 | 2.08 | 1.71 | 1.29 |

We have noted that tertiary butyl hydroperoxide exerts a similar activating effect in the isomerization of 3-methylpentane.

Figure 4:
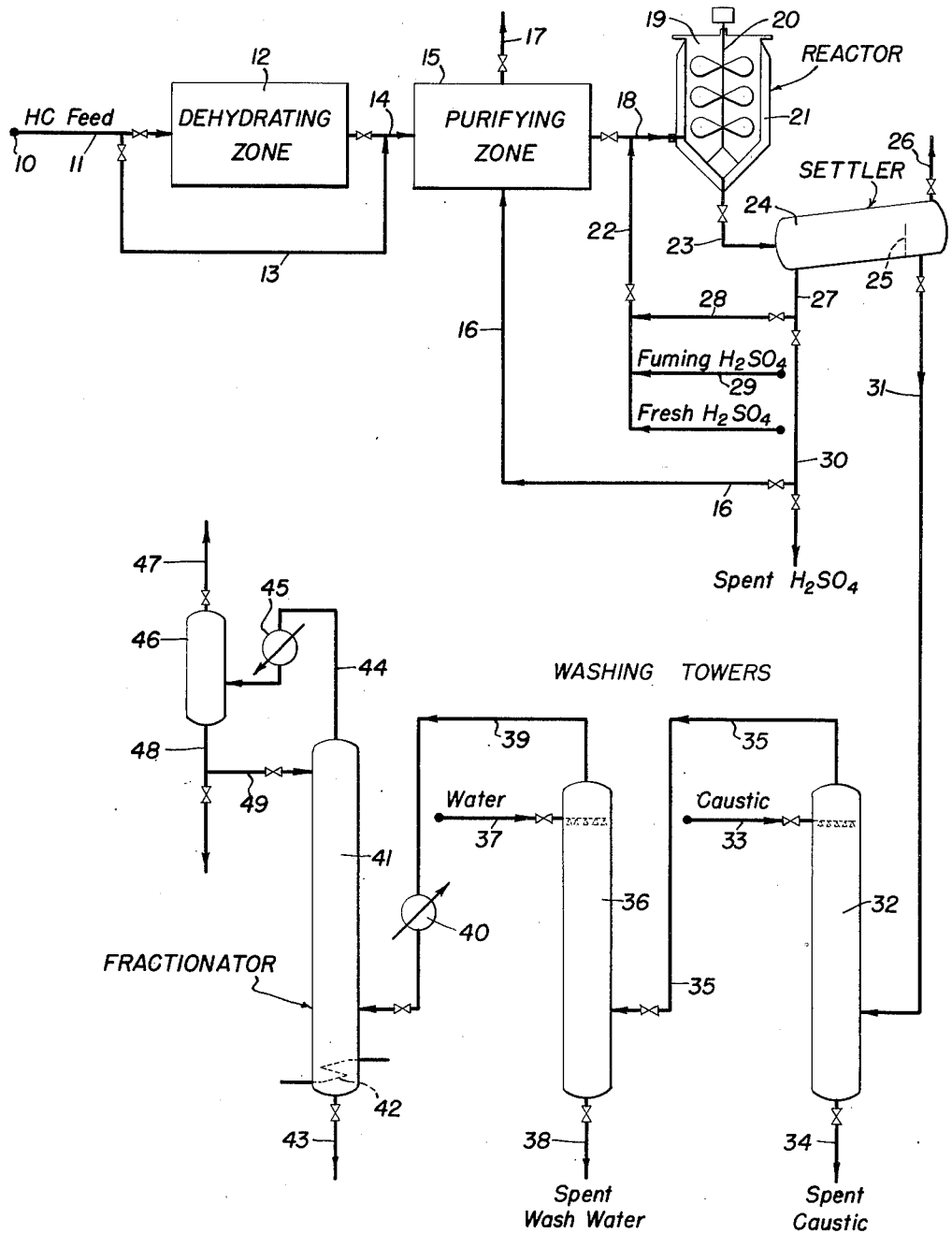

In order more fully to illustrate a practical mode of operating the process of our invention, reference is made to the flow diagram of Figure 4, which is intended to be illustrative. A suitable hydrocarbon charging stock, for example 2,4-dimethylpentane, is passed from source 10 through a valved line 11 into dehydrating equipment schematically illustrated and designated by numeral 12. The dehydrating zone may be a vessel partially filled with a solid dehydrating packing material, for example an adsorbent alumina, silica gel, Florite or the like to remove both suspended and dissolved water from the hydrocarbon charging stock. To remove only suspended water from the hydrocarbon charging stock we may employ a vessel containing degummed wood shavings (excelsior) as a packing medium. If desired, all or a portion of the charging stock may be by-passed around zone 12 through valved line 13, passing with the hydrocarbon effluents, if any, of zone 12 into valved line 14, thence to a schematically illustrated purifying zone 15. In the purifying zone, the hydrocarbon charging stock is substantially freed of organic oxygen, nitrogen and sulfur compounds, as well as any aromatic hydrocarbons, such as benzene, and olefins therein contained.

A desirable mode of purifying a hydrocarbon charging stock comprises contacting it with partially spent sulfuric acid derived from the isomerization reaction, shown entering the purifying zone through valved line 16 and leaving through valved line 17. The concentration of the partially spent sulfuric acid may range from about 91 to about 99 weight per cent, preferably 98 to 99 weight per cent, sulfuric acid. In order to purify the hydrocarbon feed stock in zone 15, between about 0.5 and about 2.0 parts by weight of sulfuric acid may be contacted with each unit weight of hydrocarbon at a temperature between about 10° C. and about 50° C. under a pressure sufficient to maintain a liquid phase, usually between about 0 and about 50 p. s. i. g., for a period sufficient to effect substantial purification, usually between about one and about fifteen minutes. The partially spent sulfuric acid is a highly effective purifying or pretreating agent for the hydrocarbon charging stock to be isomerized. It should be understood, however, that other methods for removing the above-designated impurities from the hydrocarbon charging stock may also be employed. If it is desirable or necessary, the hydrocarbon charging stock purified by sulfuric acid or other treatment may be redistilled before charging it to the isomerization reaction zone. It should be noted that the partially spent sulfuric acid which may be employed as a purifying agent is sufficiently strong to absorb substantial amounts of water from the hydrocarbon feed stock.

The purified hydrocarbon charging stock is passed from zone 15 through valved line 18 into the isomerization reactor 19. Fresh sulfuric acid may be charged to reactor 19 through valved lines 22 and 18. The isomerization reactor is represented in Figure 4 as an autoclave provided with an efficient mechanical stirrer 20, such as is ordinarily employed in effecting sulfuric acid-catalyzed alkylation of isoparaffinic hydrocarbons with olefinic hydrocarbons. Reactor 19 may be provided with a temperature-control jacket or coils 21. It should be understood that other forms of reactor may be employed, for example high speed pumps, such as centrifugal pumps, preferably in series with knot hole mixers, jet mixers, or the like, in order to prepare a suitable emulsion of the hydrocarbon charging stock and the acid catalyst.

The hydrocarbon charging stock may be contacted with between about 0.5 and about 2 parts by weight of sulfuric acid having a concentration between 99 and 100 per cent at a temperature between about 15° and about 50° C., preferably about 20° to about 30° C. Preferably 99.7 to 99.8 sulfuric acid is employed at a 1:1 acid : hydrocarbon weight ratio at about 25° C. The contacting period of the hydrocarbon in the reactor may range from about ten to about one hundred minutes.

Upon completion of the desired reaction period, the reaction mixture is discharged from the reactor through valved line 23 to a settling drum 24 provided with a weir 25 and a valved vent line 26. If desired a cooler (not shown) may be interposed in line 23 between reactor 19 and settler 24. The settler may be operated at a temperature between about 10° and about 50° C. and the liquid contents are maintained therein for a sufficient period of time to permit the reaction mixture to be resolved into a lower layer of partially spent acid and an upper hydrocarbon layer which flows over weir 25 into the upper portion of the settler. The acid layer is withdrawn from settler 24 through valved line 27, whence all or part thereof may be recycled through valved line 28, thence through valved lines 22 and 18 into reactor 19. It is usually desirable to withdraw part of the partially spent sulfuric acid from the reaction system and to fortify the fraction of recycled sulfuric acid with SO₃ or fuming sulfuric acid to bring it to the desired strength (99 to 100 weight per cent sulfuric acid). Fuming sulfuric acid or SO₃ can be introduced into the recycle acid stream through line 29. Partially spent sulfuric acid is withdrawn from the system through valved line 30 and is replaced by fresh acid entering the system through valved line 22. If desired, all or part of the partially spent sulfuric acid may be diverted from valved line 30 through valved line 16 for passage to the feed stock purifying zone 15.

Hydrocarbons are withdrawn from the upper portion of settler 24 through valved line 31 for passage into the lower portion of a washing tower 32 provided with a valved inlet line 33 for the admission of aqueous alkali to the upper portion of the tower. The small proportion of acid carried over with the hydrocarbons from the settler is removed by reaction with the caustic, spent caustic being withdrawn from the lower end of tower 32 through valved line 34.

The neutralized hydrocarbon mixture is withdrawn from the upper end of tower 32 through valved line 35, whence it is passed into washing tower 36 provided with a valved inlet line 37 in the upper portion thereof for the admission of water and a valved line 38 in the lower end thereof for the removal of spent wash water. The water-washed mixture of hydrocarbon reaction products is passed from the upper end of tower 36 through valved line 39 and heat exchanger 40 into a fractionating tower 41 provided with a reboiler coil 42.

In the present illustrative example in which the isomerization of 2,4-dimethylpentane to 2,3-dimethylpentane is described, the 2,3-dimethylpentane product (boiling point, 89.8° C.) is removed as a bottoms fraction from fractionator 41 through valved line 43. Unconverted 2,4-dimethylpentane (boiling point, 80.6° C.) distills overhead through line 44, whence it is passed through condenser 45 into an accumulator drum 46 provided with valved vent line 47. A portion of the 2,4-dimethylpentane is withdrawn from the lower end of drum 46 through valved line 48, whence a part thereof may be passed through valved line 49 into the upper portion of fractionator 41 to serve as reflux and the remainder withdrawn from the system or, preferably, recycled to reactor 19.

It is extremely advantageous to recycle 2,4-dimethylpentane from valved line 48 to reactor 19 since this material, having been subjected to extensive contact with strong sulfuric acid, usually contains no impurities which would tend to react with further quantities of 99–100 per cent sulfuric acid, these having been removed in the first contacting operation in reactor 19. The isomerization of 2,4-dimethylpentane to 2,3-dimethylpentane results in an ASTM clear octane number increase from 83.8 to 89 and in an increase of the F-4 (rich mixture) octane number from 83 to 143.

Although we have described mechanical agitation as a means for effecting intimate contacting of charging stock with the acid, other means of effecting said contact may be employed for the purposes of our invention. Thus, we have found that stearic acid may be used in proportions between about 0.5 and about 1 per cent by weight, based upon the weight of the acid, to form a stable emulsion of the hydrocarbon charging stock, for example 3-methylpentane, and the sulfuric acid. Isomerization proceeds in the emulsion thus produced at a rate which is not substantially different from the rate obtained by effecting intimate contact of the acid and hydrocarbon by mechanical means. If desired, the emulsion may be stirred mechanically from time to time. Upon completion of the desired reaction in the emulsion, the emulsion may be broken by contacting with water which dissolves and dilutes the sulfuric acid and permits the hydrocarbon reaction products to separate as a supernatant liquid layer, whose components can then be separated by fractional distillation. The diluted acid can be concentrated and employed in further isomerization operations. An alternative method of resolving the acid-hydrocarbon emulsion involves distillation of the hydrocarbon from the emulsion, preferably under reduced pressure; this method is advantageous because little or no acid concentration before recycle thereof to isomerization is necessary. Still another, and possibly a preferred, method of treating the emulsion in which the desired reaction has been completed is to centrifuge the emulsion to separate converted hydrocarbons and sulfuric acid, which can be reused.

Although in specific working examples we have described the isomerization of monomethyl- and dimethylpentanes and of cis- and trans-1,4-dimethylcyclohexanes, it will be appreciated that our invention is not thus limited and may be applied to numerous other hydrocarbon species. Broadly, the isomerization process of the present invention may be applied to alkyl-substituted, particularly methyl-substituted, saturated hydrocarbons containing at least 6 carbon atoms in the molecule, containing no quaternary carbon atoms and containing a secondary carbon atom adjacent the alkyl- or methyl-substituted carbon atom. For purposes of definition, it may be remarked that a primary carbon atom is linked by one valence bond to another carbon atom and by its remaining valence bonds to hydrogen. A secondary carbon atom is linked to two other carbon atoms, the remaining two valence bonds being satisfied by hdrogen. A tertiary carbon atom is linked to 3 other carbon atoms, the remaining valence bond being satisfied by hydrogen. A quaternary carbon atom is linked by all four of its valence bonds to other carbon atoms.

Hydrocarbon products produced by the process of the present invention may find application as high octane number motor fuels, solvents, and as intermediates for chemical synthesis, for the preparation, for example, of halogen derivatives, nitro derivatives, sulfonates, alcohols, ketones, Grignard reagents and the like.

Having thus described our invention, we claim:

1. In a process for isomerizing a saturated hydrocarbon containing isomerization-inhibiting impurities, said saturated hydrocarbon having an alkyl substituent on a non-terminal carbon atom, said hydrocarbon containing at least 6 carbon atoms per molecule, no quaternary carbon atom and at least one secondary carbon atom adjacent an alkyl substituted carbon atom, the steps of contacting said hydrocarbon in a purifying zone with spent sulfuric acid, derived from the isomerization process hereinafter defined, in quantity sufficient to remove at least a substantial proportion of said isomerization-inhibiting impurities, thereafter intimately contacting the hydrocarbon thus purified in a reaction zone with a catalytic proportion of sulfuric acid having an initial concentration between 99 and 99.8 weight per cent sulfuric acid at an isomerization reaction temperature, withdrawing spent sulfuric acid having a titratable acidity between 91 and 99 weight per cent sulfuric acid from said reaction zone, and recycling at least a portion of said spent sulfuric acid from said reaction zone to said purifying zone.

2. In a continuous process for isomerizing a saturated hydrocarbon containing sulfuric acid-soluble isomerization-inhibiting impurities, said saturated hydrocarbon having an alkyl substituent on a non-terminal carbon atom, said hydrocarbon containing at least 6 carbon atoms per molecule, no quaternary carbon atom and at least one secondary carbon atom adjacent an alkyl substituted carbon atom, the steps of contacting said hydrocarbon in a purifying zone with spent sulfuric acid, derived from the isomerization process hereinafter defined, in quantity sufficient to remove at least a substantial proportion of said isomerization-inhibiting impurities, thereafter intimately contacting the hydrocarbon thus purified in a reaction zone with a catalytic proportion of sulfuric acid having an initial concentration between 99 and 99.8 weight per cent sulfuric acid at an isomerization reaction temperature, withdrawing spent sulfuric acid having a titratable acidity between 91 and 99 weight per cent sulfuric acid from said reaction zone, recycling at least a portion of said spent sulfuric acid from said reaction zone to said purifying zone, and recycling sulfuric acid having a concentration between 99 and 99.8 weight per cent sulfuric acid to said reaction zone.

3. The process of claim 1 wherein the alkyl substituent is methyl.

4. The process of claim 1 wherein the saturated hydrocarbon is a methyl pentane.

5. The process of claim 1 wherein the saturated hydrocarbon is a dimethyl pentane.

6. The process of claim 1 wherein the saturated hydrocarbon is a stearoisomeric dimethylcyclohexane.

7. The process of claim 1 which includes contacting said hydrocarbon in the liquid phase in said reaction zone with between about 0.5 and about 2 parts by weight of said sulfuric acid having an initial concentration between 99 and 99.8 weight percent per part by weight of said hydrocarbon, at a temperature between about 15° C. and about 50° C. and for a period of time sufficient to effect substantial isomerization.

ALAN K. ROEBUCK.
BERNARD L. EVERING.

REFERENCES CITED

The following references are of record in the file of this patent:

UNITED STATES PATENTS

| Number | Name | Date |
|---|---|---|
| 2,373,740 | Birch et al. | Apr. 17, 1945 |
| 2,378,733 | Sensel | June 19, 1945 |
| 2,404,080 | McCulloch | July 16, 1946 |
| 2,404,661 | Sanderson | July 23, 1946 |
| 2,423,845 | Myers | July 15, 1947 |

OTHER REFERENCES

Caesar et al.: Ind. Eng. Chem., vol. 33, pp. 1426–8 (1941).